(12) United States Patent
Tsuchiya (10) Patent No.: US 10,122,261 B2
(45) Date of Patent: Nov. 6, 2018

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Taichiro Tsuchiya, Chuo-ku (JP)

(73) Assignee: TOSHIBA MITSUBISHI-ELECTRIC INDUSTRIAL SYSTEM CORPORATION, Chuo-ku (JP)

( * ) Notice: Subject to any disclaimer, the term of this patent is extended or adjusted under 35 U.S.C. 154(b) by 0 days.

(21) Appl. No.: 15/736,051

(22) PCT Filed: Jun. 15, 2015

(86) PCT No.: PCT/JP2015/067155
§ 371 (c)(1),
(2) Date: Dec. 13, 2017

(87) PCT Pub. No.: WO2016/203516
PCT Pub. Date: Dec. 22, 2016

(65) Prior Publication Data
US 2018/0191238 A1    Jul. 5, 2018

(51) Int. Cl.
*G05F 1/00* (2006.01)
*H02M 7/08* (2006.01)
(Continued)

(52) U.S. Cl.
CPC .............. *H02M 1/32* (2013.01); *H02M 1/08* (2013.01); *H02M 7/797* (2013.01)

(58) Field of Classification Search
CPC ...... G05F 1/565; G05F 1/575; H02M 7/1557; H02M 7/1623; H02M 7/1626
(Continued)

(56) References Cited

U.S. PATENT DOCUMENTS

| | | | | |
|---|---|---|---|---|
| 5,986,909 A | * | 11/1999 | Hammond | ............... H02M 7/49 363/37 |
| 2008/0198630 A1 | * | 8/2008 | Hiller | .................... H02M 7/217 363/13 |

(Continued)

FOREIGN PATENT DOCUMENTS

WO    2007/025828 A1    3/2007

OTHER PUBLICATIONS

International Search Report dated Sep. 8, 2015 in PCT/JP2015/067155 filed Jun. 15, 2015.

*Primary Examiner* — Gary Nash
(74) *Attorney, Agent, or Firm* — Oblon, McClelland, Maier & Neustadt, L.L.P.

(57) ABSTRACT

An MMC includes arms each configured with one unit converter or a plurality of cells connected in series. A control circuit of the cell transmits a voltage detected value of a DC capacitor to a control device and controls on/off of a switching element in accordance with a control signal received from the control device. When the voltage detected value of at least one cell exceeds a first threshold voltage, the control device transmits a gate block signal to the control circuit of each cell. The control circuit of each cell autonomously fixes the switching element of its own main circuit to an off state and short-circuits the output terminals of the main circuit, irrespective of the control signal, when its own voltage detected value exceeds a second threshold voltage higher than the first threshold voltage.

4 Claims, 6 Drawing Sheets

(51) Int. Cl.
*H02M 7/10* (2006.01)
*H02M 7/04* (2006.01)
*H02M 7/155* (2006.01)
*H02M 1/32* (2007.01)
*H02M 1/08* (2006.01)
*H02M 7/797* (2006.01)

(58) Field of Classification Search
USPC .... 323/271, 274, 276, 284, 285; 363/65, 67, 363/68, 78, 89, 92, 129
See application file for complete search history.

(56) References Cited

U.S. PATENT DOCUMENTS

| | | | |
|---|---|---|---|
| 2012/0113698 A1* | 5/2012 | Inoue | H02M 1/08 363/123 |
| 2013/0121042 A1* | 5/2013 | Gan | H02M 7/49 363/37 |
| 2013/0148392 A1* | 6/2013 | Inoue | H02M 7/10 363/68 |
| 2013/0208519 A1* | 8/2013 | Yamamoto | H02M 7/12 363/67 |
| 2014/0063870 A1* | 3/2014 | Bousfield, III | H02M 7/49 363/37 |

* cited by examiner

POWER CONVERSION DEVICE

TECHNICAL FIELD

The present invention relates to a power conversion device and more specifically to a power conversion device including an arm configured with one unit converter or a plurality of unit converters connected in series.

BACKGROUND ART

In recent years, the use of MMCs (Modular Multilevel Converters) has been contemplated in self-commutated static var compensators such as STATCOM (Static Synchronous Compensator), direct-current transmission systems such as BTB (Back to Back) system, and motor drive inverters (for example, see WO2007/025828 (PTD 1)).

The MMC includes an arm configured with a plurality of unit converters connected in series. Each unit converter includes a switching element and a direct-current (DC) capacitor. The unit converter allows the switching element to perform switching operation to output voltage of the DC capacitor to the output terminal. In general, a semiconductor switching element capable of on/off control, such as IGBT (Insulated Gate Bipolar Transistor), is used as a switching element.

CITATION LIST

Patent Document

PTD 1: WO2007/025828

SUMMARY OF INVENTION

Technical Problem

In controlling an MMC, it is necessary to perform communication between a plurality of unit converters and a control device. For example, when a voltage increase failure in the DC capacitor occurs in a unit converter, the control device transmits a control signal for giving an instruction to block the gate of the switching element to all the unit converters in the MMC. In this way, each unit converter is brought into a state in which the switching element is fixed to the off state whereby each unit converter is protected from overvoltage.

Unfortunately, with the control configuration as described above, it is difficult for the control device to transmit a control signal to the unit converter when a communication error between the control device and the unit converter occurs. This may result in a serious failure in the unit converter.

The present invention is made to solve the aforementioned problem and an object of the present invention is to protect each unit converter even when a communication error occurs between the control device and the unit converter in a power conversion device including an arm configured with one or more unit converters connected in series.

Solution to Problem

A power conversion device according to an aspect of the present invention includes a power converter and a control device configured to control the power converter. The power converter includes an arm configured with one unit converter or a plurality of unit converters connected in series. The unit converter includes a main circuit, a control circuit, and a switch. The main circuit includes a switching element and a DC capacitor and outputs a voltage pulse according to voltage of the DC capacitor by turning on/off of the switching element. The control circuit is configured to transmit a voltage detected value of the DC capacitor to the control device and to control on/off of the switching element in accordance with a control signal received from the control device. The switch is configured to turn on in response to an on command from the control circuit to short-circuit output terminals of the main circuit. The control device is configured to compare a plurality of voltage detected values received from the unit converters with a first threshold voltage and, when at least one of the plurality of voltage detected value exceeds the first threshold voltage, transmit the control signal for fixing the switching element to an off state to the control circuit of each of the unit converters. In each of the unit converters, the control circuit is configured to compare its own voltage detected value with a second threshold voltage higher than the first threshold voltage and, when the voltage detected value exceeds the second threshold voltage, the control circuit is autonomously configured to fix the switching element in its own main circuit to an off state and turns on the switch, irrespective of the control signal.

Advantageous Effects of Invention

According to the present invention, in a power conversion device including an arm configured with one unit converter or a plurality of unit converters connected in series, each unit converter can be protected even when a communication error between the control device and the unit converter occurs.

DESCRIPTION OF EMBODIMENTS

Embodiments of the present invention will be described in detail below with reference to the figures. In the following, the same or corresponding parts in the figures are denoted by the same reference signs and a description thereof will basically not be repeated.

[Configuration of Power Conversion Device]

Figure 1:
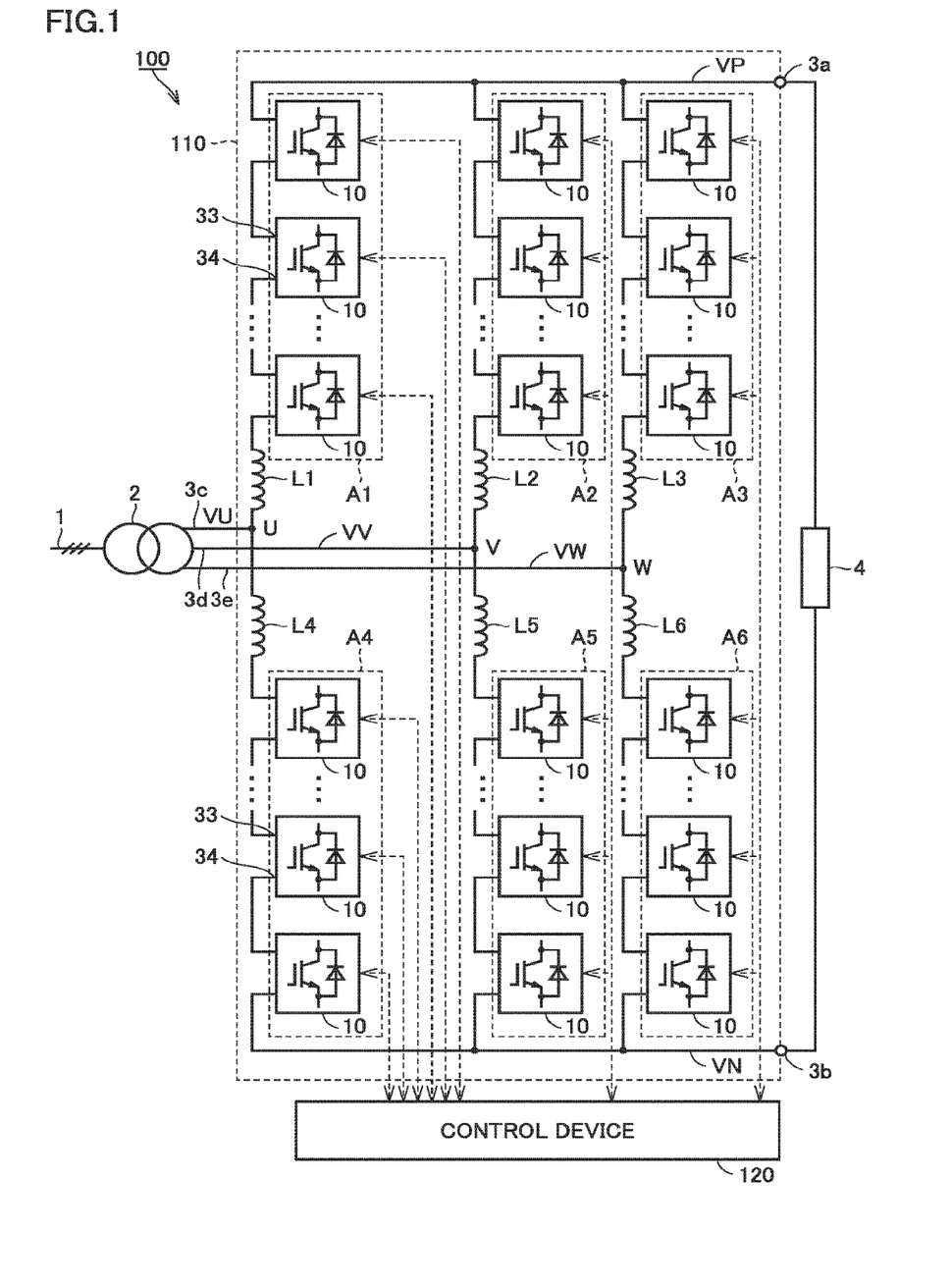
FIG. 1 is an overall configuration diagram of a power conversion device according to an embodiment of the present invention.

FIG. 1 is an overall configuration diagram of a power conversion device according to an embodiment of the present invention. Referring to FIG. 1, a power conversion device 100 includes a modular multilevel converter (MMC) 110 and a control device 120 for controlling MMC 110.

MMC 110 includes a positive voltage terminal 3a, a negative voltage terminal 3b, and three alternating-current (AC) terminals 3c to 3e. MMC 110 is a bidirectional power conversion device that converts one of direct-current (DC) power and three-phase AC power into the other. Positive voltage terminal 3a and negative voltage terminal 3b are used for receiving DC power. Three AC terminals 3c to 3e are used for receiving three-phase AC power. MMC 110 corresponds to an embodiment of "power converter" in the present invention.

Positive voltage terminal 3a and negative voltage terminal 3b are connected to a load 4. Examples of load 4 applied include DC loads, DC power supplies, and motor drive inverters.

Three AC terminals 3c to 3e are connected to three secondary terminals of a three-phase transformer 2. The primary terminals of three-phase transformer 2 are connected to three-phase power transmission lines of an AC power system 1 through a not-shown breaker. The breaker is in a conducting state during normal operation and enters a non-conducting state, for example, when a short-circuit accident occurs between terminals 3a and 3b.

When power is supplied from AC power system 1 to load 4, three-phase AC power of AC power system 1 is supplied to MMC 110 through three-phase transformer 2. MMC 110 converts three-phase AC power into DC power. The converted DC power is supplied to load 4. That is, MMC 110 operates as an AC-DC conversion device that converts AC power into DC power.

On the other hand, when power is supplied from load 4 to AC power system 1, DC power is supplied from load 4 to MMC 110. MMC 110 converts DC power into three-phase AC power. The converted three-phase AC power is supplied to AC power system 1 through three-phase transformer 2. That is, MMC 110 operates as a DC-AC conversion device that converts DC power into AC power.

MMC 110 further includes arms A1 to A6 and reactors L1 to L6. Arms A1 to A3 have one terminals connected together to positive voltage terminal 3a and the other terminals connected respectively to one terminals of reactors L1 to L3. The other terminals of reactors L1 to L3 are connected to AC terminals 3c to 3e, respectively.

Arms A4 to A6 have one terminals connected together to negative voltage terminal 3b and the other terminals connected respectively to one terminals of reactors L4 to L6. Reactors L4 to L6 have the other terminals connected to AC terminals 3c to 3e, respectively.

Positive voltage terminal 3a is supplied with positive DC voltage VP from MMC 110 and load 4. Negative voltage terminal 3b is supplied with negative DC voltage VN from MMC 110 and load 4. AC terminal 3c is supplied with U-phase AC voltage VU from three-phase transformer 2 and MMC 110. AC terminal 3d is supplied with V-phase AC voltage VV from three-phase transformer 2 and MMC 110. AC terminal 3e is supplied with W-phase AC voltage VW from three-phase transformer 2 and MMC 110. The phases of three-phase AC voltages VU, VV, VW are shifted from each other by 120 degrees.

Arms A1 and A4 constitute a U-phase module that performs bidirectional power conversion between U-phase AC voltage VU and DC voltages VP, VN. Arms A2 and A5 constitute a V-phase module that performs bidirectional power conversion between V-phase AC voltage VV and DC voltages VP, VN. Arms A3 and A6 constitute a W-phase module that performs bidirectional power conversion between W-phase AC voltage VW and DC voltages VP, VN.

The inductance of reactors L1 to L6 is set to a value necessary for controlling current flowing through each arm A and for suppressing cyclic current flowing between the three phase modules when the amplitudes of AC voltages VU, VV, VW differ.

[Configuration of Unit Converter]

Figure 2:
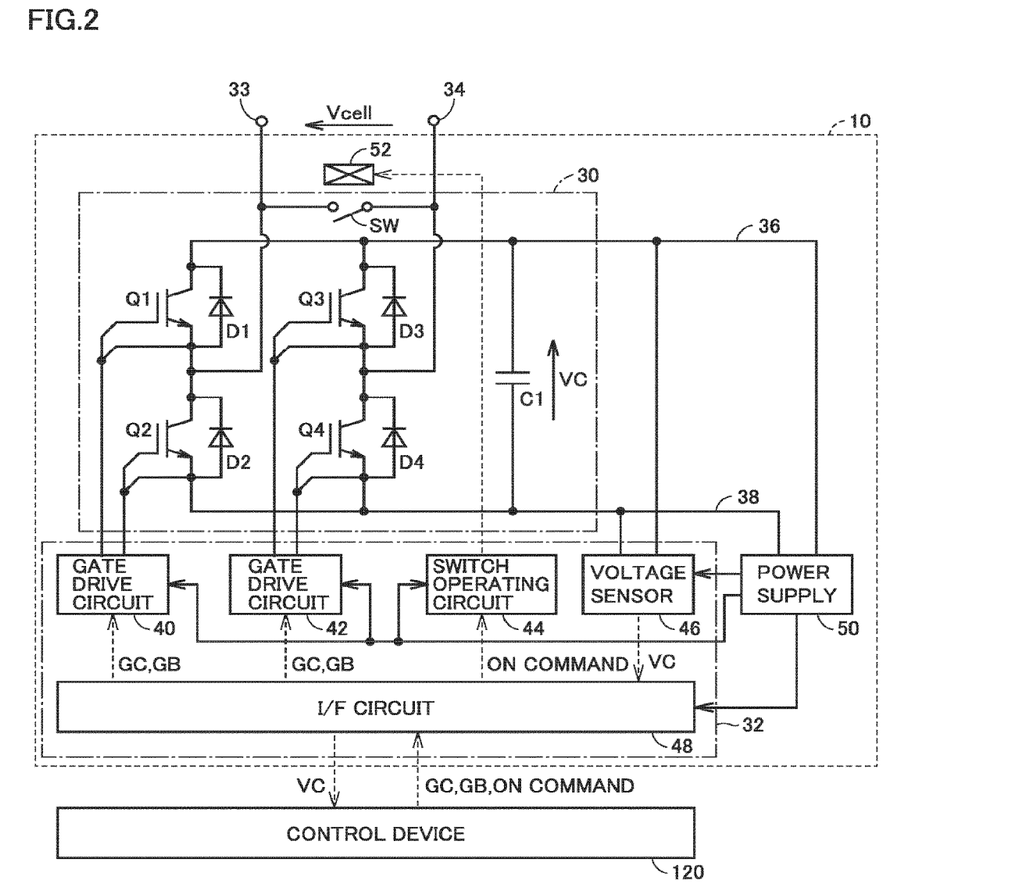
FIG. 2 is a diagram showing a configuration example of the cell shown in FIG. 1.

Each of arms A1 to A6 includes a plurality of cascaded unit converters (hereinafter also referred to as cells) 10. FIG. 2 is a diagram showing a configuration example of cell 10 shown in FIG. 1. Referring to FIG. 2, cell 10 includes a main circuit 30, a control circuit 32, and a power supply 50.

Main circuit 30 is configured with a full-bridge circuit including a DC capacitor. Specifically, main circuit 30 is a two-terminal circuit having a first terminal 33 and a second terminal 34. Main circuit 30 includes switching elements Q1 to Q4, diodes D1 to D4, and a DC capacitor C1.

Switching elements Q1 to Q4 each are a self-commutated power semiconductor device and formed of, for example, an IGBT. Switching elements Q1, Q2 are connected in series between a power line pair (positive electrode line 36 and negative electrode line 38). Switching elements Q3, Q4 are connected in series between the power line pair. The collectors of switching elements Q1, Q3 are connected together to positive electrode line 36, and the emitters of switching elements Q2, Q4 are connected together to negative electrode line 38. The connection point between the emitter of switching element Q1 and the collector of switching element Q2 is connected to first terminal 33. The connection point between the emitter of switching element Q3 and the collector of switching element Q4 is connected to second terminal 34.

Diodes D1 to D4 are connected in anti-parallel with switching elements Q1 to Q4, respectively. DC capacitor C1 is connected between positive electrode line 36 and negative electrode line 38. DC capacitor C1 smoothes the output of the full-bridge circuit.

As shown in FIG. 1, first terminals 33 of cells 10 positioned at one ends of arms A1 to A3 are connected together to positive voltage terminal 3a. In arms A1 to A3, second terminal 34 of each cell 10 is connected to first terminal 33 of cell 10 adjacent on the AC terminal 3c to 3e side. Second terminals 34 of cells 10 positioned on the other ends of arms A1 to A3 are connected to one terminals of reactors L1 to L3, respectively.

First terminals 33 of cells 10 positioned on one ends of arms A4 to A6 are connected to one terminals of reactors L4 to L6, respectively. In arms A4 to A6, second terminal 34 of each cell 10 is connected to first terminal 33 of cell 10 adjacent on the negative voltage terminal 3b side. Second terminals 34 of cells 10 positioned on the other ends of arms A4 to A6 are connected together to negative voltage terminal 3b.

In cell 10, switching elements Q1, Q2 are alternately turned on and off. Switching elements Q3, Q4 are alternately turned on and off. As shown in FIG. 2, when the voltage to first terminal 33 with reference to second terminal 34 is defined as cell voltage Vcell, cell voltage Vcell is controlled by the on/off state of switching elements Q1 to Q4.

Specifically, when switching elements Q1, Q2 are turned on and off, respectively, and switching elements Q3, Q4 are turned off and on, respectively, cell voltage Vcell is approximately equal to voltage VC of DC capacitor C1. When switching elements Q1, Q2 are turned on and off, respectively, and switching elements Q3, Q4 are turned on and off, respectively, cell voltage Vcell is approximately zero. When switching elements Q1, Q2 are turned off and on, respectively, and switching elements Q3, Q4 are turned off and on, respectively, cell voltage Vcell is approximately zero. When switching elements Q1, Q2 are turned off and on, respectively, and switching elements Q3, Q4 are turned on and off, respectively, cell voltage Vcell is approximately equal to a voltage with a reverse polarity of voltage VC of DC capacitor C1.

When all switching elements Q1 to Q4 are off, cell voltage Vcell is determined depending on the polarity of current flowing through cell 10. When current is positive, cell voltage Vcell is approximately equal to voltage VC of DC capacitor C1. When current is negative, cell voltage Vcell is approximately equal to a voltage with a reverse polarity of voltage VC of DC capacitor C1.

The voltage between two terminals of each arm A is represented by the sum of cell voltages Vcell of cells 10 included in this arm A. Therefore, the voltage of each arm A can be controlled by the on/off state of switching elements Q1 to Q4 included in cell 10.

Main circuit 30 further includes a switch SW. Switch SW is connected between first terminal 33 and second terminal 34. Switch SW is configured to turn on (closed) in response to an on command (close command) from control circuit 32 to short-circuit first terminal 33 and second terminal 34. That is, turning on switch SW allows the output of cell 10 to be short-circuited. Switch SW corresponds to an embodiment of "switch" in the present invention.

Control circuit 32 includes gate drive circuits 40, 42, a switch operating circuit 44, a voltage sensor 46, and an I/F (interface) circuit 48.

I/F circuit 48 communicates with control device 120 through a not-shown optical fiber cable. I/F circuit 48 receives a gate signal GC for controlling the full-bridge circuit of main circuit 30 from control device 120. I/F circuit 48 further receives a gate block signal GB for stopping switching operation of switching elements Q1 to Q4 (turning off all) included in the full-bridge circuit from control device 120. I/F circuit 48 outputs the received gate signal GC and gate block signal GB to gate drive circuits 40, 42.

Gate drive circuit 40 controls on/off of switching elements Q1, Q2 in response to gate signal GC. Alternatively, gate drive circuit 40 sets switching elements Q1, Q2 to a state fixed to the off state (stop state) in response to gate block signal GB.

Gate drive circuit 42 controls on/off of switching elements Q3, Q4 in response to gate signal GC. Alternatively, gate drive circuit 42 sets switching elements Q3, Q4 to a state fixed to the off state in response to gate block signal GB.

Switch operating circuit 44 is a circuit for operating on/off of switch SW. Switch operating circuit 44 is configured to control energization to an excitation coil 52 provided such that switch SW is turned off (opened) during non-energization, in response to a command from control device 120. During normal operation, since current supply to excitation coil 52 is stopped, switch SW is in the off state. On the other hand, when abnormality such as a short-circuit failure in a switching element is detected in any cell 10 of a plurality of cells 10, control device 120 outputs an on command for switch SW to the failed cell 10. In the failed cell 10, I/F circuit 48 receives and outputs the on command to switch operating circuit 44. In response to the on command, switch operating circuit 44 supplies current to excitation coil 52 to turn on switch SW. The output of the failed cell 10 is then short-circuited.

Voltage sensor 46 detects voltage VC of DC capacitor C1 and outputs the detected value to I/F circuit 48. I/F circuit 48 transmits voltage VC detected by voltage sensor 46 to control device 120.

Power supply 50 is connected in parallel with DC capacitor C1. Power supply 50 lowers voltage VC of DC capacitor C1 to generate power supply voltage to be supplied to control circuit 32. That is, each cell 10 is capable of supplying power from main circuit 30 to control circuit 32 and forms a self-feeding cell.

[Control Configuration of Power Conversion Device]

Control device 120 communicates with control circuit 32 of each cell 10 to control power conversion in main circuit 30 of each cell 10. Here, control device 120 controls power conversion based on the detected value of voltage VC of DC capacitor C1 of each cell 10 to charge DC capacitor C1 of each cell 10 to a predetermined DC voltage.

Control device 120 employs, for example, PWM (Pulse Width Modulation) control as the control scheme for switching elements Q1 to Q4 of each cell 10. Control device 120 receives the detected value of voltage VC of DC capacitor C1 from I/F circuit 48 of each cell 10 and receives the detected value of current flowing through AC power system 1 from a not-shown current sensor to generate gate signal GC for controlling switching elements Q1 to Q4 of each cell 10 by PWM control based on these detected values.

In addition, control device 120 monitors the detected value of voltage VC of DC capacitor C1 in each cell 10 to detect abnormality of voltage VC.

For example, when any disturbance occurs in AC power system 1 connected with power conversion device 100, the disturbance may make unsteady three-phase AC power supplied to power conversion device 100. This causes voltage VC of DC capacitor C1 to vary in each cell 10. If voltage VC varies, the control of switching elements Q1 to Q4 becomes unstable and therefore overvoltage exceeding the withstand voltage may be applied to the switching elements. This may result in damage of the switching elements.

In order to protect the switching elements from such a trouble, control device 120 detects abnormality of voltage VC of DC capacitor C1, based on the detected value of voltage VC transmitted from each cell 10. Specifically, control device 120 compares the detected value of voltage VC with a preset threshold voltage DCOV1 (first threshold voltage) for each cell 10. Then if it is determined that voltage VC exceeds threshold voltage DCOV1 in at least one cell 10, control device 120 generates gate block signal GB for all cells 10 included in MMC 110. Accordingly, in each cell 10 of MMC 110, main circuit 30 enters a gate block state (stop state) in response to gate block signal GB, so that switching elements Q1 to Q4 can be protected from overvoltage.

However, during communication between control device 120 and control circuit 32 of each cell 10, a communication error may occur between control device 120 and control circuits 32 of some cells 10.

As an example of the communication error, it is assumed that communication is lost between control device 120 and control circuit 32 of cell 10. In this case, since it is difficult for control device 120 to control switching elements Q1 to Q4 in the concerned cell 10 normally, the switching elements receiving overvoltage may be damaged, as is the case with disturbance in AC power system 1. Therefore, when communication blackout is detected, control device 120 need to immediately output gate block signal GB to all cells 10 included in MMC 110 to bring main circuit 30 of each cell 10 into a gate block state.

However, in actuality, there exist a required time from occurrence of communication blackout to detection of communication blackout by control device 120 and a required time from detection of communication blackout by control device 120 to output of gate block signal GB. A lag time then occurs from when communication blackout occurs to when each cell 10 enters the gate block state. This lag time may cause overvoltage to be applied to switching elements Q1 to Q4 before main circuit 30 enters the gate block state.

As another example of the communication error, it is assumed that the detected value of voltage VC of DC capacitor C1 transmitted from cell 10 has an error although communication blackout described above does not result. In this case, control device 120 is unable to compare the detected value of voltage VC with threshold voltage DCOV1 normally and therefore may not be able to detect that voltage VC exceeds threshold voltage DCOV1.

As described above, when a communication error occurs between control device 120 and control device 32 of cell 10, it is difficult for control device 120 to perform control such that main circuit 30 of each cell 10 is in the gate block state, and cell 10 may suffer a serious failure.

Then in power conversion device 100 according to the present embodiment, each cell 10 is configured to detect abnormality of voltage VC of its own DC capacitor C1 by self-diagnosis. With this configuration, each cell 10 can autonomously set its own main circuit 30 to the gate block state when abnormality of voltage VC is detected, irrespective of gate block signal GB transmitted from control device 120.

Figure 3:
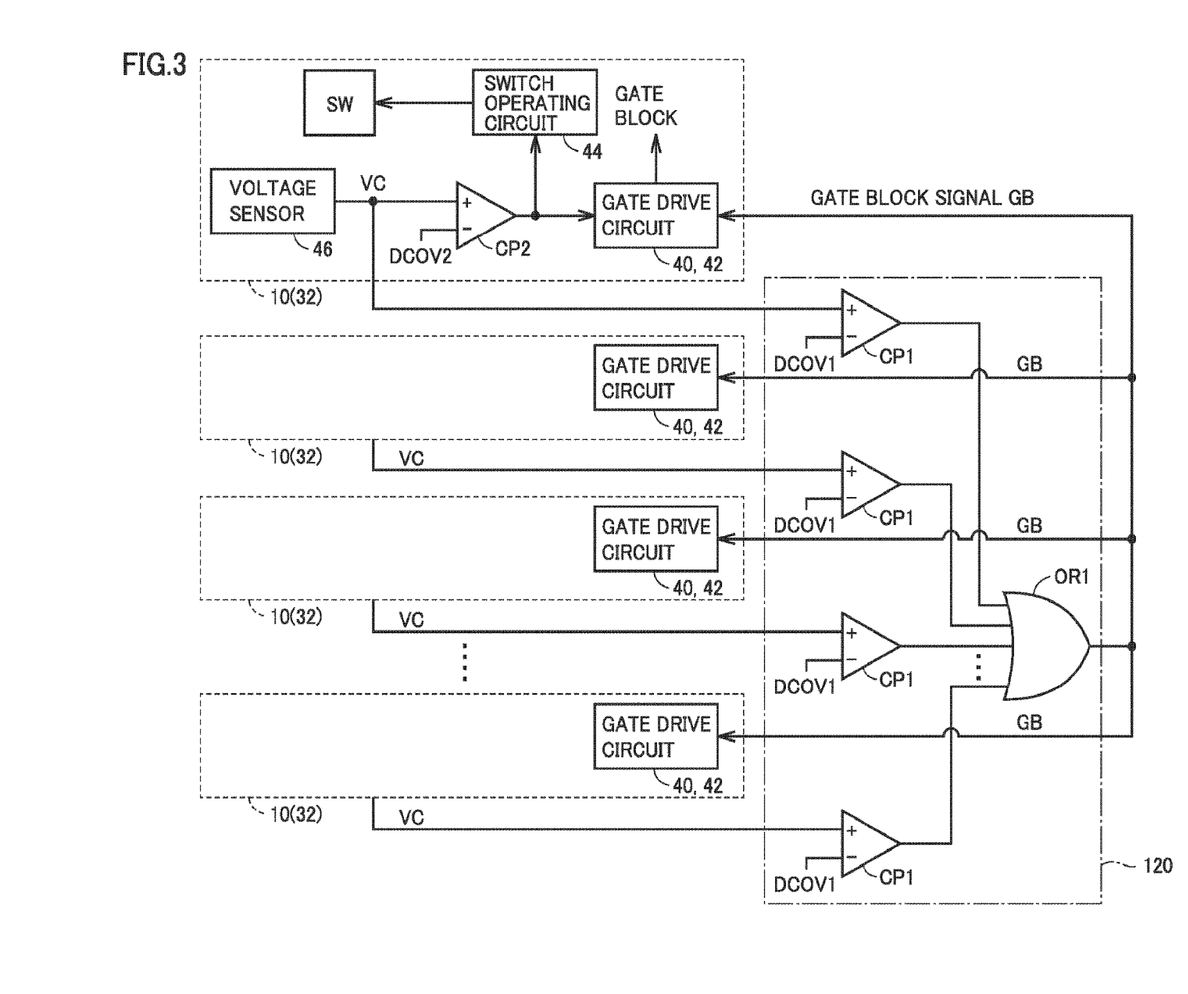
FIG. 3 is a block diagram showing a control configuration for implementing detection of abnormality of voltage of the DC capacitor in a control device and each cell.

FIG. 3 is a block diagram showing a control configuration for implementing detection of abnormality of voltage VC of DC capacitor C1 in control device 120 and each cell 10.

Referring to FIG. 3, control device 120 includes a plurality of comparators CP1 and an OR circuit OR1. A plurality of comparators CP1 are associated one-to-one with a plurality of cells 10 included in MMC 110.

Each comparator CP1 has its non-inverting input (+terminal) receiving the detected value of voltage VC of DC capacitor C1 by voltage sensor 46 contained in control circuit 32 of the corresponding cell 10. Each comparator CP1 has its inverting input (−terminal) receiving threshold voltage DCOV1. Comparator CP1 compares the detected value of voltage VC with threshold voltage DCOV1 and outputs the comparison result. When the detected value of voltage VC exceeds threshold voltage DCOV1, the output signal of comparator CP1 goes to H (logic high) level. On the other hand, when the detected value of voltage VC is equal to or lower than threshold voltage DCOV1, the output signal of comparator CP1 goes to L (logic low) level.

OR circuit OR1 receives the output signals of a plurality of comparators CP1 to output the OR of these output signals. The OR is transmitted as gate block signal GB to each control circuit 32 of cell 10. When the output signal of at least one comparator CP1 is at H level, that is, when the detected value of voltage VC exceeds threshold voltage DCOV1 in at least one cell 10, gate block signal GB is activated to H level. On the other hand, when the output signals of all of a plurality of comparators CP1 are at L level, that is, when the detected value of voltage VC is equal to or lower than threshold voltage DCOV1 in all cells 10, gate block signal GB is deactivated to L level.

In control circuit 32 of each cell 10, gate drive circuit 42 receives gate block signal GB through I/F circuit 48. When gate block signal GB is activated to H level, gate drive circuits 40, 42 set main circuit 30 to the gate block state.

With the configuration above, when it is determined that the detected value of voltage VC of DC capacitor C1 exceeds threshold voltage DCOV1 in any one of a plurality of cells 10 included in MMC 110, control device 120 outputs gate block signal GB activated to H level to control circuits 32 of all cells 10 to set all cells 10 to the gate block state.

By contrast, control circuit 32 of each cell 10 includes a comparator CP2. Comparator CP2 is provided in not-shown I/F circuit 48. Comparator CP2 has its non-inverting input (+terminal) receiving the detected value of voltage VC of DC capacitor C1 by voltage sensor 46. Comparator CP2 has its inverting input (−terminal) receiving threshold voltage DCOV2 (second threshold voltage).

Here, threshold voltage DCOV2 (second threshold voltage) has a voltage value higher than threshold voltage DCOV1 (first threshold voltage) used for abnormality detection in control device 120. Specifically, threshold voltage DCOV2 is set to be higher than threshold voltage DCOV1 and equal to or lower than the withstand voltage of switching elements Q1 to Q4. Threshold voltage DCOV2 is set to a voltage value higher than threshold voltage DCOV1 in order to avoid overlap between a command based on the output of comparator CP1 and a command based on the output of comparator CP2, in each cell 10.

Comparator CP2 compares the detected value of voltage VC with threshold voltage DCOV2 and outputs the comparison result. When the detected value of voltage VC exceeds threshold voltage DCOV2, the output signal of comparator CP2 goes to H level. On the other hand, when the detected value of voltage VC is equal to or lower than threshold voltage DCOV2, the output signal of comparator CP2 goes to L level.

The output signal of comparator CP2 is provided to switch operating circuit 44 and gate drive circuits 40, 42. When the output signal of comparator CP2 is at H level, that is, when the detected value of voltage VC exceeds threshold voltage DCOV2, gate drive circuits 40, 42 autonomously set main circuit 30 to the gate block state, irrespective of gate block signal GB.

When the output signal of comparator CP2 is at H level, switch operating circuit 44 autonomously turns on switch SW by supplying current to excitation coil 52 (FIG. 2), irrespective of the on command.

As described above, when each cell 10 is configured to detect abnormality of voltage VC by self-diagnosis to set main circuit 30 to the gate block state, in one arm A (FIG. 1) in MMC 110, it may happen that main circuit 30 is stopped in some cells 10 of a plurality of cells 10 connected in series while main circuit 30 is kept operating in the remaining cells 10. When such a case happens, in some cells 10 described above, current flows in the inside of main circuit 30 in the direction shown by the arrow in FIG. 4. Current flows through diode D3, capacitor C1, and diode D2 whereby charge is accumulated in capacitor C1. Charging capacitor C1 may further increase voltage VC.

Figure 4:
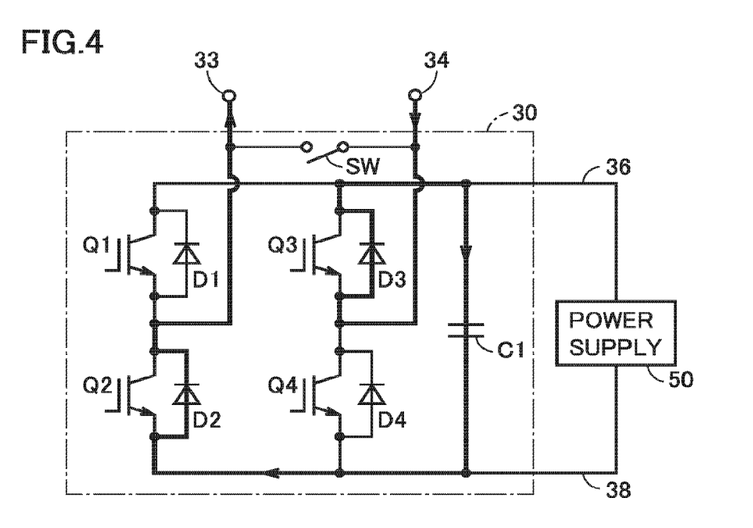
FIG. 4 is a diagram for explaining a charging path for the DC capacitor.

Then, in each cell 10, when the detected value of voltage VC exceeds threshold voltage DCOV2, main circuit 30 is autonomously set to the gate block state, and switch SW is autonomously turned on. By short-circuiting first terminal 33 and second terminal 34, it is possible to avoid formation of a charging path for accumulating charge in DC capacitor C1.

Figure 5:
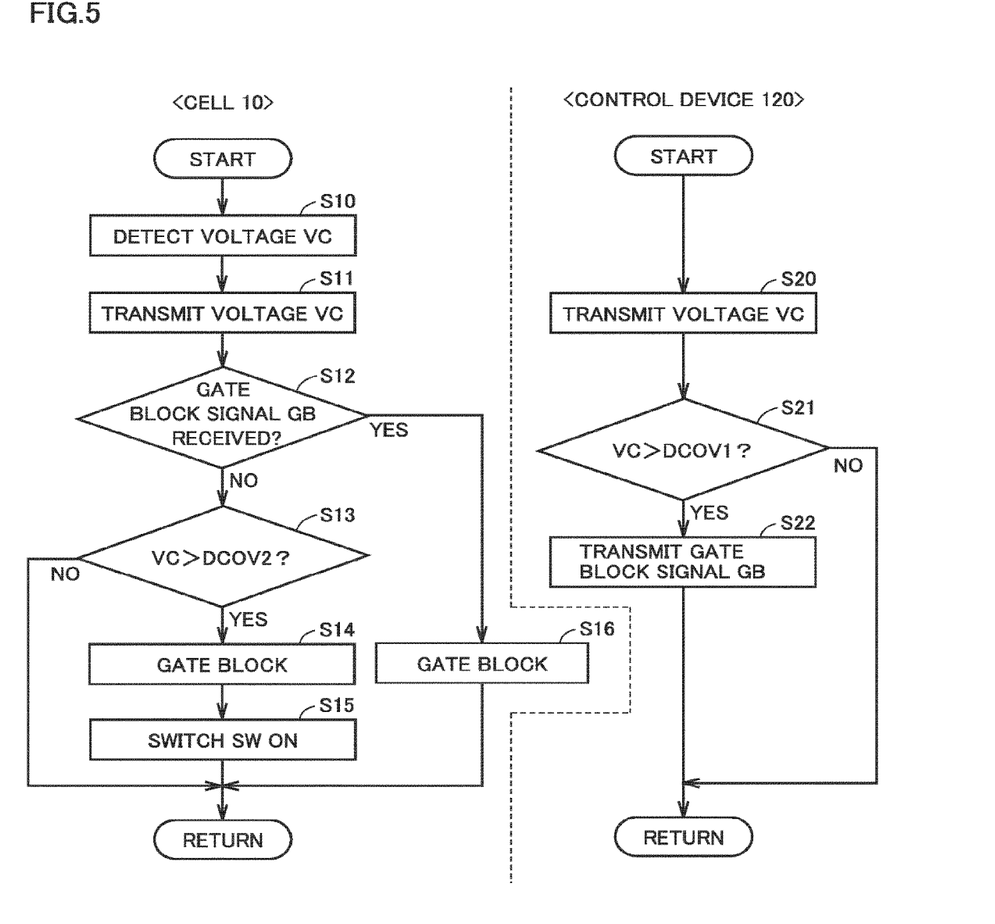
FIG. 5 is a flowchart for explaining the process of detecting abnormality of voltage of the DC capacitor in the control device and each cell.

FIG. 5 is a flowchart for explaining the process of detecting abnormality of voltage VC of DC capacitor C1 in control device 120 and each cell 10.

Referring to FIG. 5, in each cell 10, in step S10, voltage sensor 46 detects voltage VC of DC capacitor C1. In step S11, I/F circuit 48 transmits voltage VC detected by voltage sensor 46 to control device 120.

In step S12, I/F circuit 48 determines whether gate block signal GB has been received from control device 120. If it is determined that gate block signal GB has been received (YES in the determination in S12), the process proceeds to step S16, and I/F circuit 48 outputs gate block signal GB to gate drive circuits 40, 42. Gate drive circuits 40, 42 supply gate block signal GB to the gates of switching elements Q1 to Q4 to set main circuit 30 to the gate block state.

On the other hand, if it is determined that gate block signal GB has not been received (NO in the determination in S12), the process proceeds to step S13, and I/F circuit 48 uses comparator CP2 to determine whether the detected value of voltage VC exceeds threshold voltage DCOV2. If it is determined that the detected value of voltage VC is equal to or lower than threshold voltage DCOV2 (NO in the determination in S13), I/F circuit 48 determines that abnormality of voltage VC does not occur, and the process ends.

By contrast, if it is determined that the detected value of voltage VC exceeds threshold voltage DCOV2 (YES in the determination in S13), I/F circuit 48 outputs the output signal of comparator CP2 activated to H level to gate drive circuits 40, 42 and switch operating circuit 44.

In step S14, gate drive circuits 40, 42 set main circuit 30 to the gate block state in response to the output signal activated to H level. In step S15, switch operating circuit 44 turns on switch SW in response to the output signal activated to H level to short-circuit first terminal 33 and second terminal 34.

On the other hand, in control device 120, in step S20, the detected value of voltage VC of DC capacitor C1 is received from control circuit 32 of each cell 10. Control device 120 proceeds to step S21 and uses comparator CP1 provided for each cell 10 to determine whether the detected value of voltage VC of each cell 10 exceeds threshold voltage DCOV1. If it is determined that the detected value of voltage VC is equal to or lower than threshold voltage DCOV2 in all cells 10 (YES in the determination in S21), control device 120 determines that abnormality of voltage VC does not occur, and the process ends.

By contrast, if it is determined that the detected value of voltage VC exceeds threshold voltage DCOV1 in any one of cells 10 (YES in the determination in S21), control device 120 generates gate block signal GB activated to H level and outputs the generated gate block signal GB to gate drive circuits 40, 42 of all cells 10.

As described above, in the power conversion device according to the present embodiment, each cell 10 included in MMC 110 can autonomously set its own main circuit 30 to the gate block state, irrespective of gate block signal GB transmitted from control device 120 on the higher level, when abnormality of voltage VC of its own DC capacitor C1 is detected by self-diagnosis. This can avoid a serious failure in cell 10 when a communication error occurs between control device 120 and control circuit 32 of cell 10.

[Modification to Power Conversion Device]

Although main circuit 30 of cell 10 includes a full-bridge circuit in the foregoing embodiment, main circuit 30 may include a bidirectional chopper circuit.

Figure 6:
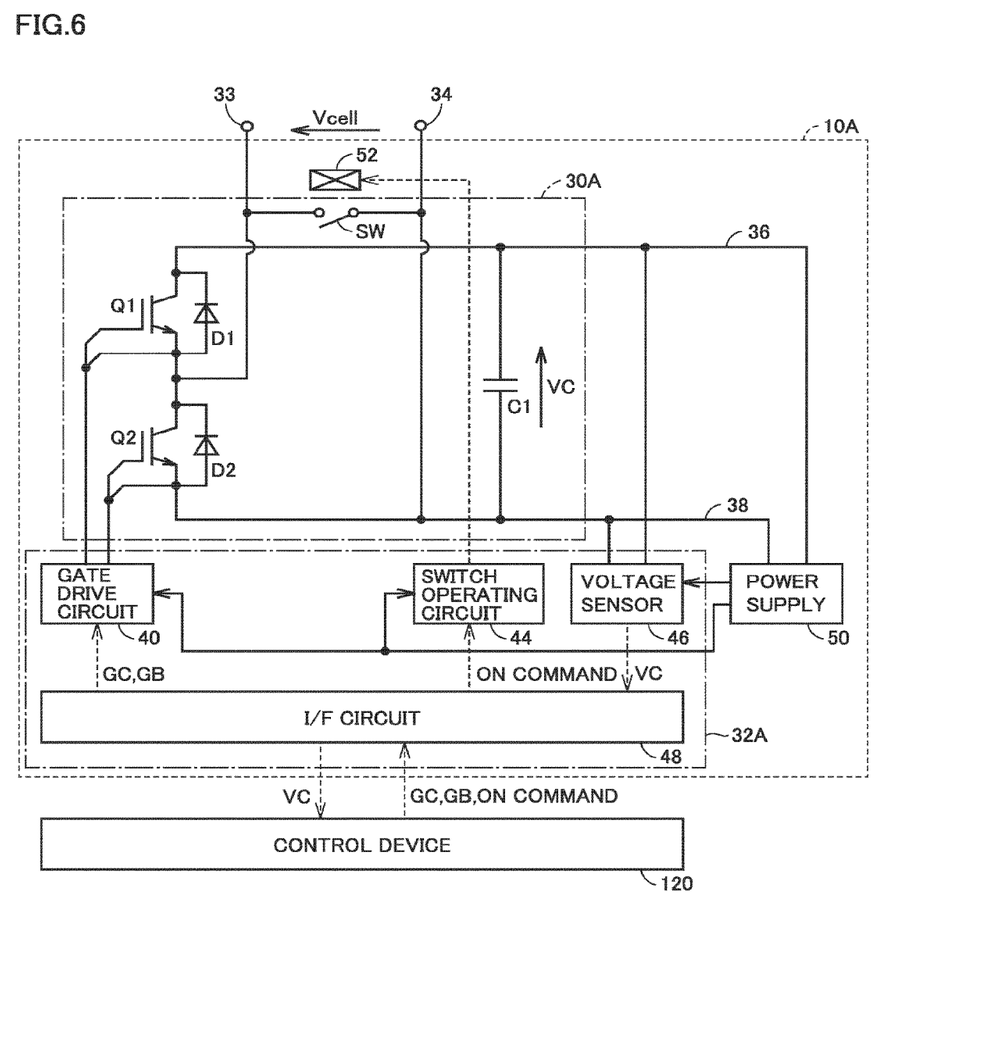
FIG. 6 is a diagram showing another configuration example of the cell shown in FIG. 1.

FIG. 6 is a diagram showing another configuration example of cell 10 shown in FIG. 1. Referring to FIG. 6, a cell 10A according to the present modification includes a main circuit 30A, a control circuit 32A, and a power supply 50. Main circuit 30A is configured with a bidirectional chopper circuit including a DC capacitor. Specifically, main circuit 30A is a two-terminal circuit having a first terminal 33 and a second terminal 34 and includes switching elements Q1, Q2, diodes D1, D2, and a DC capacitor C1. Also in the present modification, a switch SW is connected between first terminal 33 and second terminal 34.

Although three-phase MMC 110 connected to a three-phase AC power system is illustrated as a power converter in the foregoing embodiment, the present invention is also applicable to a single-phase MMC connected to a single-phase power system or an MMC for driving a motor. In the present invention, a double Y-connected MMC has been illustrated, in which six single-phase converters, each formed of a series of an arm including one or more cascaded cells and a reactor, are connected double in Y configuration. However, the present invention is also applicable to a D-connected MMC including three connected in delta configuration or a Y-connected MMC including three single-phase converters connected in Y configuration.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 AC power system, 2 three-phase transformer, 3a positive voltage terminal, 3b negative voltage terminal, 3c to 3c AC terminal, 4 load, 10, 10A unit converter (cell), 30 main circuit, 32, 32A control circuit, 33 first terminal, 34 second terminal, 36 positive electrode line, 38 negative electrode line, 40, 42 gate drive circuit, 44 switch operating circuit, 46 voltage sensor, 48 I/F circuit, 50 power supply, 52 excitation coil, 100 power conversion device, 110 MMC, 120 control device, A1 to A6 arm, C1 DC capacitor, L1 to L6 reactor, GC gate signal, GB gate block signal, Q1 to Q4 switching element, D1 to D4 diode, SW switch, CP1, CP2 comparator, DCOV1, DCOV2 threshold voltage.

The invention claimed is:

1. A power conversion device comprising:
a power converter including an arm configured with one unit converter or a plurality of unit converters connected in series; and
a control device configured to control the power converter,
the unit converter including
a main circuit including a switching element and a direct-current capacitor and configured to output a voltage pulse according to voltage of the direct-current capacitor by turning on/off of the switching element,
a control circuit configured to transmit a voltage detected value of the direct-current capacitor to the control device and to control on/off of the switching element in accordance with a control signal received from the control device, and
a switch configured to turn on in response to an on command from the control circuit to short-circuit output terminals of the main circuit,
the control device being configured to compare a plurality of the voltage detected values received from the unit converters with a first threshold voltage and, when at least one of the plurality of voltage detected values exceeds the first threshold voltage, transmit the control signal for fixing the switching element to an off state to the control circuit of each of the unit converters, and
in each of the unit converters, the control circuit being configured to compare its own the voltage detected value with a second threshold voltage higher than the first threshold voltage and, when the voltage detected value exceeds the second threshold voltage, the control circuit autonomously being configured to fix the switching element in its own the main circuit to an off state and turns on the switch, irrespective of the control signal.

2. The power conversion device according to claim 1, wherein the second threshold voltage is higher than the first threshold voltage and equal to or lower than a withstand voltage of the switching element.

3. The power conversion device according to claim 2, wherein the unit converter further includes a power supply configured to lower voltage of the direct-current capacitor to generate power supply voltage to be supplied to the control circuit.

4. The power conversion device according to claim 1, wherein the unit converter further includes a power supply configured to lower voltage of the direct-current capacitor to generate power supply voltage to be supplied to the control circuit.

* * * * *